US011028852B2

(12) United States Patent
Cho et al.

(10) Patent No.: US 11,028,852 B2
(45) Date of Patent: Jun. 8, 2021

(54) DRAIN PUMP

(71) Applicant: LG Electronics Inc., Seou (KR)

(72) Inventors: Sangyoung Cho, Seoul (KR);
Changsub Kim, Seoul (KR);
Changhyeon Song, Seoul (KR);
Youngjin Oh, Seoul (KR); Seonjoong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 184 days.

(21) Appl. No.: 16/277,172

(22) Filed: Feb. 15, 2019

(65) Prior Publication Data

US 2020/0003216 A1 Jan. 2, 2020

(30) Foreign Application Priority Data

Jun. 29, 2018 (KR) .................. 10-2018-0075998

(51) Int. Cl.
*F04D 13/06* (2006.01)
*F04D 13/08* (2006.01)
*D06F 39/08* (2006.01)

(52) U.S. Cl.
CPC ....... *F04D 13/0693* (2013.01); *D06F 39/085* (2013.01); *F04D 13/086* (2013.01)

(58) Field of Classification Search
CPC .... F04D 13/0693; F04D 13/086; F04D 29/40; F04D 25/0606; F04D 13/0606; H02K 5/22; H02K 5/04
See application file for complete search history.

(56) References Cited

U.S. PATENT DOCUMENTS

| 7,059,901 | B2 * | 6/2006 | Morita | ............... H01R 13/5219 439/271 |
| 2006/0034716 | A1 * | 2/2006 | Marioni | .................. F04D 13/06 417/423.12 |
| 2010/0202905 | A1 | 8/2010 | Marioni | |

FOREIGN PATENT DOCUMENTS

| JP | 2005318742 | | 11/2005 |
| JP | 2005318742 A | * | 11/2005 |
| JP | 2008291780 | | 12/2008 |
| JP | 2010220430 | | 9/2010 |
| JP | 2014110697 | | 6/2014 |

(Continued)

OTHER PUBLICATIONS

English translation of JP-2005318742-A (Yamada) obtained Oct. 9, 2020 (Year: 2020).*

(Continued)

*Primary Examiner* — Connor J Tremarche
(74) *Attorney, Agent, or Firm* — Fish & Richardson P.C.

(57) ABSTRACT

A drain pump includes an impeller, a rotor configured to rotate the impeller, a stator, a first housing that defines a rotor accommodating portion, a second housing that is coupled to the first housing and that defines together with the first housing a motor accommodating space that accommodates the stator, a connector that extends from the stator and that has a contact surface configured to connect to a power source and exposed to an outside of the motor accommodating space through at least one of the first housing or the second housing, and a connector cover portion that is located at at least one of the first housing or the second housing to cover the connector and that has at least one side surface opened to expose the contact surface of the connector to the outside of the motor accommodating space.

17 Claims, 10 Drawing Sheets

(56) References Cited

FOREIGN PATENT DOCUMENTS

KR   1020080093344   10/2008
WO   WO2017111528    6/2017

OTHER PUBLICATIONS

Extended European Search Report in European Application No. 19150491.9, dated Jul. 25, 2019, 9 pages.

* cited by examiner

DRAIN PUMP

CROSS-REFERENCE TO RELATED APPLICATION

Pursuant to 35 U.S.C. § 119(a), this application claims the benefit of an earlier filing date of and the right of priority to Korean Application No. 10-2018-0075998, filed on Jun. 29, 2018, the contents of which are incorporated by reference herein in its entirety.

FIELD

The present disclosure relates to a drain pump that can be applied to a clothes treating apparatus such as a washing machine or a dryer or applied to a dishwasher.

BACKGROUND

A washing machine or a washer using water may include a drain pump to discharge used water. In some cases, the drain pump may include a one-way motor or a two-way motor as needed.

In some examples, the drain pump may operate an impeller which may be disposed in water or brought into contact with water. In some cases, to increase reliability and performance of the pump, a pump assembly may be tightly sealed to prevent water from being introduced into the pump.

For example, a method of molding a housing as a single body or coupling a plurality of housings in a hook-coupling manner may increase airtightness. In the molding or hooking method, a connector for connecting an inner motor to an external power source may be exposed to an outside of a housing.

In some cases, the connector, which is a power source unit, may be coupled to a motor housing in a manner of being drawn out in a radial direction. In these cases, a contact surface of the connector may be arranged to face an axial direction. When water is dropped (or dripped), the dropped water may permeate into the housing through a gap between the connector and the housing.

In some cases, the drain pump may not have a structure for covering the connector, which may cause introduction of water into the housing through a gap around the connector.

In some cases where an installation portion of the connector is located at the same height as an outer surface of the housing, the dropped water may be introduced into the housing through the gap around the connector.

SUMMARY

The present disclosure provides a drain pump that can suppress or reduce permeation of water into a gap around a connector, which is a power source part, by having a contact surface of the connector in an intersecting direction with a direction that water is dropped.

The present disclosure also provides a drain pump that can prevent or reduce dropped water from being introduced into a housing by covering a connector.

The present disclosure also provides a drain pump that can prevent or reduce introduction of water into a housing by covering a connector and having the covered portion higher than an outer surface of the housing.

The present disclosure further provides a drain pump that can prevent or reduce water from being introduced into a housing by allowing water to flow down without being gathered around the connector, and a device having the same.

According to one aspect of the subject matter described in this application, a drain pump includes an impeller; a rotor that includes a rotary shaft coupled to the impeller and that is configured to provide rotational force to the impeller; a stator located at an outer circumferential surface of the rotor and configured to rotate the rotor; a first housing that defines a rotor accommodating portion that accommodates the rotor, where the rotor is configured to rotate in the rotor accommodating portion; a second housing coupled to the first housing, where the second housing defines together with the first housing a motor accommodating space that accommodates the stator; a connector that extends from the stator and has a contact surface configured to connect to a power source and exposed to an outside of the motor accommodating space through at least one of the first housing or the second housing; and a connector cover portion that is located at at least one of the first housing or the second housing to cover the connector, the connector cover portion having at least one side surface opened to expose the contact surface of the connector to the outside of the motor accommodating space.

Implementations according to this aspect may include one or more of the following features. For example, at least one of the first housing or the second housing may define a connector mounting groove that receives the connector, where the connector cover portion extends from an outer circumferential surface of the connector mounting groove. In some examples, the connector cover portion may define a cover opening that exposes the contact surface of the connector that is inserted into the connector mounting groove, where the cover opening is defined at a surface of the connector cover portion opposite to the impeller.

In some examples, the connector cover portion includes a water blocking protrusion that extends from a circumference of the cover opening by a predetermined height. In some examples, the connector cover portion further includes an outer circumferential surface that extends from a first side of the connector cover portion in a direction inclined with respect to a center of the first housing, where the water blocking protrusion is located at the first side of the connector cover portion. A radial distance from the center of the first housing to the outer circumferential surface of the connector cover portion may decrease from the first side to a second side of the connector cover portion opposite to the first side.

In some examples, the connector cover portion further includes an outer circumferential surface that has a curved shape or an inclined shape and that extends in a circumferential direction from a first end of the connector cover portion to a second end opposite to the first end, where a radial distance from a center of the first housing to at least one of the first end or the second end is less than a radial distance from the center of the first housing to another portion of the connector cover portion.

In some implementations, an axial depth of the connector cover portion is greater than or equal to an axial length of the connector. In some examples, the first housing has a first open surface that faces the second housing, and the second housing has a second open surface that faces the first housing. The connector cover portion may protrude from an edge surface of the first housing in a first axial direction away from the impeller, and the second housing may be configured to, based on being coupled to the first housing, overlap the connector cover portion in a second axial direction toward the impeller.

In some implementations, the second housing includes: a sidewall surface that extends in the second axial direction from an edge surface of the second housing; and a sealing protrusion that protrudes from a portion of the sidewall surface toward an inner surface of the connector and that overlaps with the connector cover portion. In some examples, the sealing protrusion has an outer circumferential surface that is curved along a circumferential direction of the second housing. In some examples, the sealing protrusion has a flat outer circumferential surface corresponding to the inner surface of the connector.

In some implementations, the connector includes first terminal portions located inside the motor accommodating space and second terminal portions located at the contact surface outside the motor accommodating space, where one of the first housing or the second housing does not include the connector cover portion, but includes a partitioning protrusion that partitions the first terminal portions. In some examples, the partitioning protrusion extends radially outward to a sidewall surface of the one of the first housing or the second housing that includes the partitioning protrusion.

According to another aspect, a drain pump includes: an impeller; a motor coupled to the impeller and configured to provide rotational force to the impeller; a motor housing configured to accommodate the motor; a connector having a first end electrically connected to the motor and a second end exposed to an outside of the motor housing, where the connector includes a contact surface configured to connect to an external power source and spaced apart from the impeller in an axial direction; and a connector cover portion that is located at the motor housing and that covers the connector. The connector cover portion includes: a first axial side surface that defines a cover opening opened in a direction opposite to the impeller, a second axial side surface opposite to the first axial side surface, a first circumferential side surface and a second circumferential side surface that are spaced apart from each other in a circumferential direction and that are each extend in the axial direction from the first axial side surface to the second axial side surface, and a radial side surface that defines an outer surface of the connector cover portion and that connects the second axial side surface, the first circumferential side surface, and the second circumferential side surface.

Implementations according to this aspect may include one or more of the following features. For example, the motor housing includes a plurality of housings that are coupled to each other, where each of the plurality of housings define an opening that faces an opening of another housing among the plurality of housings, where a first housing among the plurality of housings includes the connector cover portion, and the connector cover portion protrudes in the axial direction from an end portion of the first housing to a position outward of or corresponding to an end portion of the connector.

In some implementations, the connector cover portion further includes an inner surface that defines a connector mounting groove that receives the connector, where a second housing among the plurality of housings does not includes the connector cover portion. The second housing may be configured to, based on being coupled to the first housing, overlap the connector cover portion in the axial direction, where an outer circumferential surface of the second housing faces an inner surface of the connector. In some examples, the outer circumferential surface of the second housing has a curved shape that extends in the circumferential direction. In some examples, the outer circumferential surface of the second housing has a flat shape.

In some implementations, at least one of the first circumferential side surface, the second circumferential side surface, or the radial side surface includes a water blocking protrusion located at a position closer to the first axial side surface than to the second axial side surface. In some implementations, a distance between a center of the motor housing and at least one of the first circumferential side surface, the second circumferential side surface, or the radial side surface decreases from the first axial side surface toward the second axial side surface.

In some implementations, a drain pump according to the present disclosure may include a connector cover portion located at a motor housing to cover a connector which is exposed to outside of the motor housing, thereby preventing introduction of water into the drain pump through an exposed portion of the connector, which may result in preventing damage on a pump assembly or deterioration of the pump assembly.

In some implementations, a drain pump according to the present disclosure may include a water blocking protrusion to block water flowing to an outer surface of a connector cover portion so as to prevent the flow of the water to an open surface of the connector cover portion. This may result in more effectively preventing water from permeating between the connector cover portion and the connector.

In some implementations, a drain pump according to the present disclosure may be configured such that an outer surface of a connector cover portion is inclined in an opposite direction of an open side or inclined to both sides of the open side, so as to allow water dropped to the outer surface of the connector cover portion to flow in an opposite direction of an open surface of the connector cover portion, which may result in effectively preventing such water from permeating between the connector cover portion and the connector.

In some implementations, a drain pump according to the present disclosure may include a sealing protrusion protruding from a housing accommodated in a connector cover portion in an outer circumferential direction, so that an inner surface of a connector and an outer circumferential surface of the housing can closely contact each other. This may result in effectively preventing permeation of water between the inner surface of the connector and the outer circumferential surface of the housing.

DETAILED DESCRIPTION

Description will now be given in detail of a drain pump according to one implementation disclosed herein, with reference to the accompanying drawings. As described above, a drain pump is installed in a device for treating laundry or tableware using water, such as a washing machine, a dryer, or a washer, so as to drain used water. Hereinafter, a drain pump according to the present disclosure will be described, focusing on an example in which the drain pump is applied to a drum type washing machine.

Figure 1:
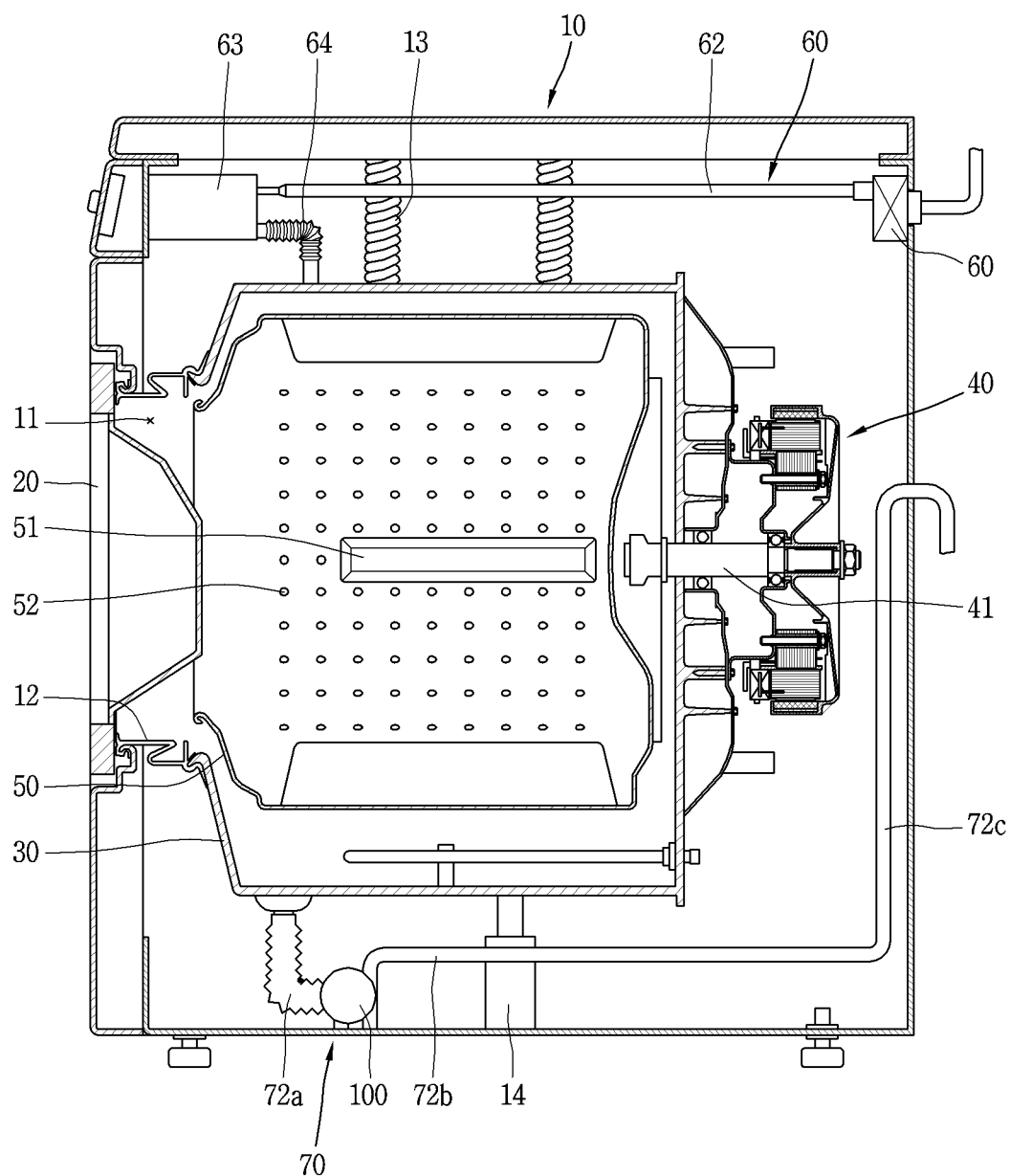
FIG. 1 is a sectional view schematically illustrating an inside of an example drum type washing machine or washer.

FIG. 1 is a sectional view schematically illustrating an inside of an example drum type washing machine.

Referring to FIG. 1, a drum type washing machine includes a cabinet 10 having a laundry inlet 11 on its front surface, a door 20 installed to open and close the laundry inlet 11 of the cabinet 10, a tub 30 provided inside the cabinet 10 to store washing water, a motor provided in the tub 30 to generate a driving force, a rotary shaft 41 connected to the motor 40, and a drum 50 connected to the rotary shaft 41 to wash the laundry by the driving force transferred from the motor 40. FIG. 1 illustrates a direct coupling type driving structure in which the motor 40 is connected directly to the rotary shaft 41 to drive the drum 50, but the present disclosure is not necessarily limited to this.

The cabinet 10 forms an outer appearance of the drum type washing machine, and the laundry inlet 11 is formed to communicate inside and outside of the cabinet 10 to each other. The door 20 is rotatably installed on a front surface of the cabinet 10 to selectively open and close the laundry inlet 11.

The door 20 has an inner surface facing the drum 50. The inner surface protrudes toward the drum 50. The laundry inlet 1 is provided with a gasket 12 on its inner circumferential surface. The gasket 12 is made of a flexible material so as to suppress a leakage of washing water inside the drum while buffering vibration of the motor 40. Accordingly, when the door 20 is closed, the washing water is rarely discharged to the outside of the drum 50. However, a gap caused due to vibration and aging may be formed between the gasket 12 of the laundry inlet 11 and the door 20, and some of the washing water may leak through the gap. The present disclosure relates to waterproofing of the drain pump due to the leakage of the washing water, which will be described later together with the structure of the drain pump.

The tub 30 is disposed inside the cabinet 10 to receive washing water. The tub 30 is supplied with washing water from an external water supply source. The tub 30 is formed in a substantially cylindrical shape. A front opening is formed at the front of the tub at a position facing the laundry inlet 11 of the cabinet 10 so as to communicate the inside and outside of the drum 50.

A circumferential surface of the tub 30 is elastically supported by a spring 13 and a damper 14 which are provided inside the cabinet 10. The tub 30 cannot rotate by itself because its circumferential surface is directly supported by the spring 13 and the damper 14. Therefore, unlike the drum 50, the tub 30 does not receive any rotational force from the motor 40.

The drum 50 is provided with a lifter 51 on its inner circumferential surface so as to lift and drop a part of the laundry and washing water accommodated therein while it is rotated by the motor 40. Thus, when the drum 50 is rotated by the motor 40, the lifter 51 lifts a part of the laundry or washing water to one side and drops it while rotating together with the drum 50.

The drum 50 is provided with a plurality of through holes 52 on its side wall, that is, the circumferential surface. The drum 50 communicates with the tub 30 through the plurality of through holes 52. Accordingly, when the washing water is supplied to the tub 30 at a certain water level or more, the drum 50 is immersed in the washing water, and some washing water is thus introduced into the drum 50 through the through holes 52.

In some implementations, a water supply unit 60 for supplying water into the tub 30 is connected to a top of the tub 30, and a drain unit 70 for draining water is connected to a bottom of the tub 30.

The water supply unit 60 is provided with a water supply valve 61 for controlling clean water supplied through an external hose, a water supply hose 62 for guiding water passing through the water supply valve 61, a detergent supply portion 63 in which the water supplied through the water supply hose 62 is mixed with prestored detergent such that the mixed water is supplied, and a water supply pipe 64 having one end connected to an outlet of the detergent supply portion 63 and another end connected to the top of the tub 30 such that the water containing the detergent or clean water without the detergent, which is discharged from the detergent supply portion 63, is guided into the tub 30.

The drain unit 70 includes a drain pump 71 for supplying a driving force for discharging the washing water stored in the tub 30, a drain pipe 72a having one end connected to a bottom of the tub and another end connected to the drain pump 71 to guide the washing water stored in the tub 30 toward the drain pump 71, a second drain pipe 72a having one end connected to the drain pump 71 and another end substantially horizontally extending toward a rear surface of the cabinet 10, and a third drain pipe 72c substantially vertically extending, and having one end connected to the second drain pipe 72a and another end connected to the rear surface of the cabinet 10 such that the washing water is discharged to the outside of the cabinet 10. The first drain pipe 72a may be configured as a bellows pipe to prevent vibration of the tub 30 from being transmitted to the drain pump 71.

Figure 2:
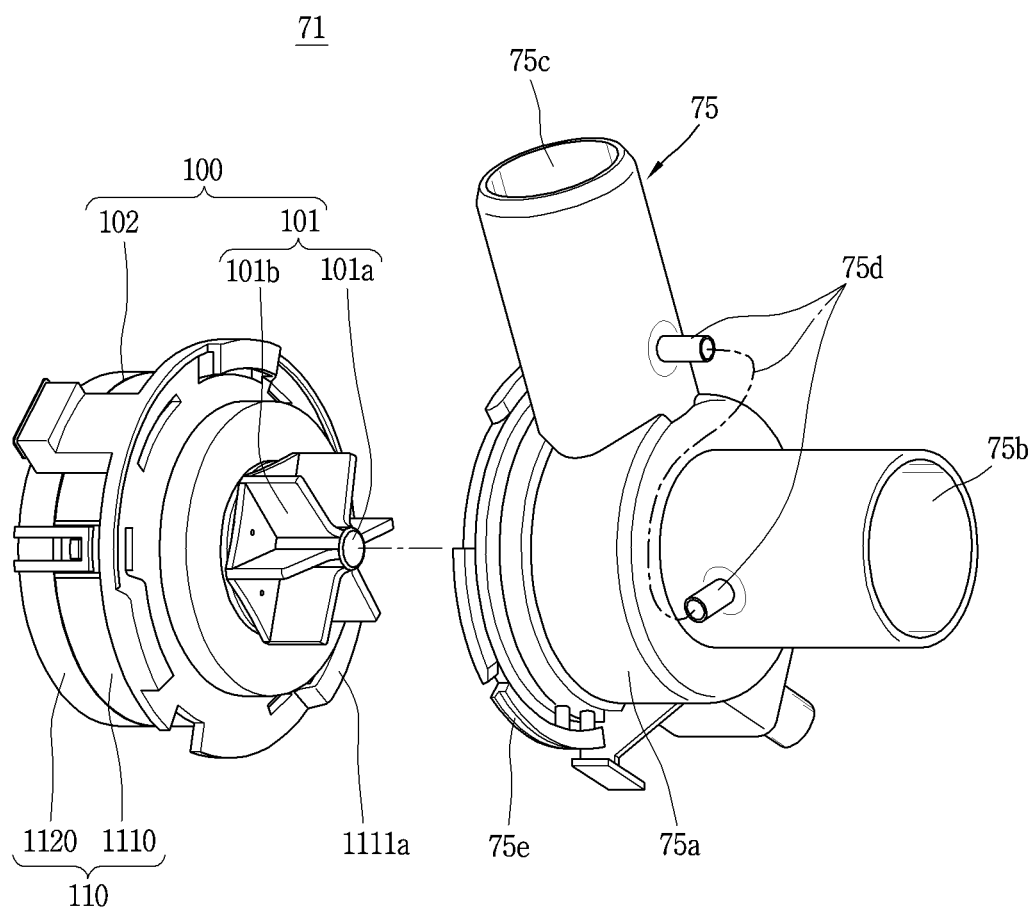
FIG. 2 is an exploded perspective view of an example drain pump of the washing machine illustrated in FIG. 1.

FIG. 2 is an exploded perspective view of the drain pump illustrated in FIG. 1. Referring to FIG. 2, the drain pump 71 includes a pump casing 75 and a pump assembly 100.

The pump casing 75 includes a casing main body 75a coupled to one end portion of the pump assembly 100 and rotatably accommodating an impeller 101 to be explained later, a water inlet pipe 75b having one end connected to the first drain pipe 72a and another end communicating with the casing main body 75a such that the washing water inside the tub 30 is introduced into the casing main body 75a, a water outlet pipe 75c having one end communicating with the casing main body 75a and another end connected to the second drain pipe 72a such that the washing water inside the casing main body 75a is discharged, and a communicating portion 75d through which the washing water introduced into the casing main body 75a is guided to the water inlet pipe 75b. The pump casing 75a may be formed as a separate component, but may alternatively be integrally formed on one side surface of a lower portion of the cabinet.

The pump assembly 100 includes an impeller 101 and a pump motor 102 for rotating the impeller 101. The impeller 101 includes a hub 101a located at a center thereof, and a plurality of blades 101b radially extending from an outer circumferential surface of the hub 101a.

The pump motor 102 includes a stator 120 and a rotor 130, which will be described later, disposed inside the motor housing 110. The motor housing 110 is provided with a plurality of stopping portions 1111a formed on an edge of one end portion thereof to which the impeller 101 is coupled, and the stopping portions 1111a are engaged with protrusions 75e provided on the pump casing 75. As the protrusions 75e are inserted into the stopping portion 1111a in an engaging manner, the motor housing 110 is coupled to the pump casing 75 and the impeller 101 is inserted into the casing main body 75a of the pump casing 75.

Figure 3:
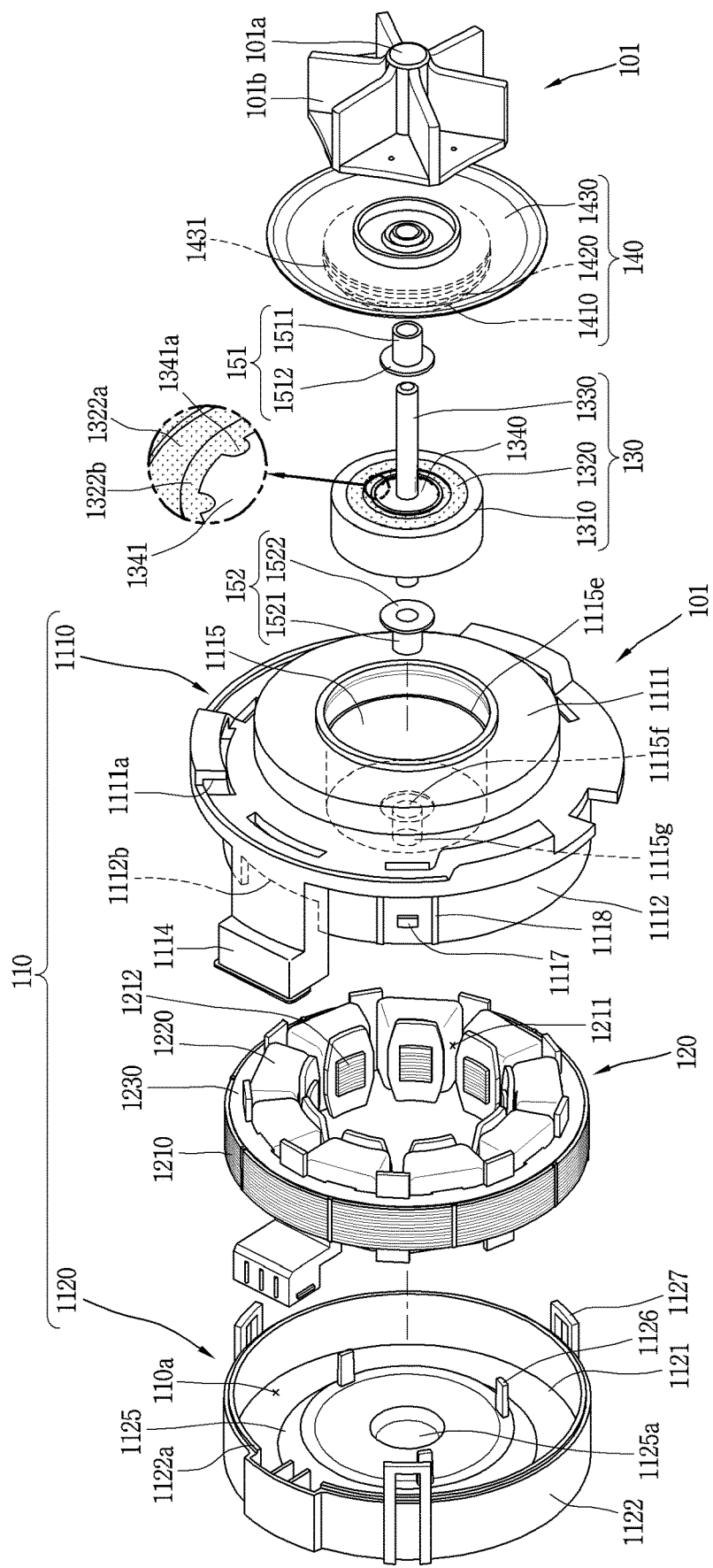
FIGS. 3 and 4 are exploded perspective views illustrating an example pump assembly including an example impeller and an example motor housing.
Figure 4:
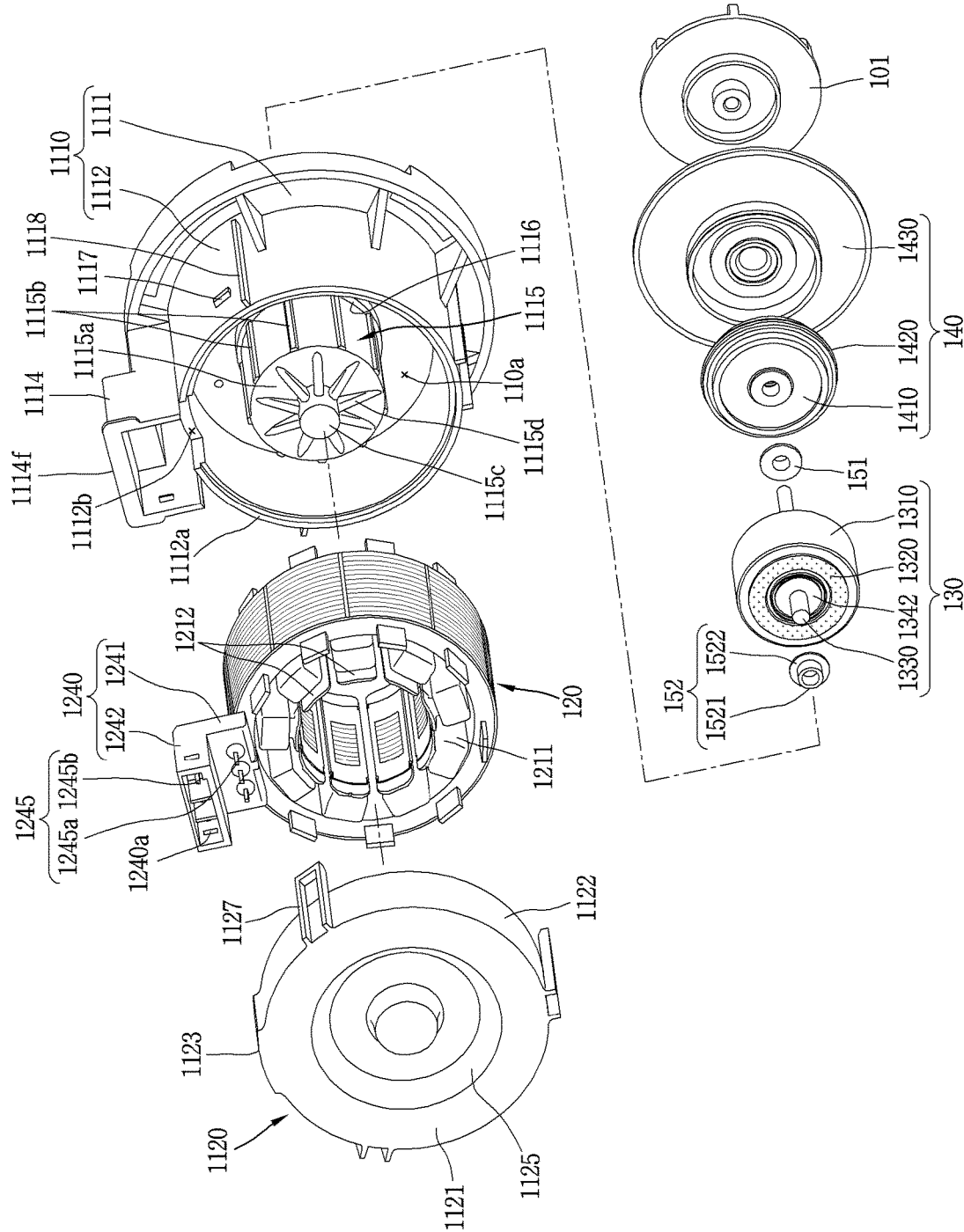
Figure 5:
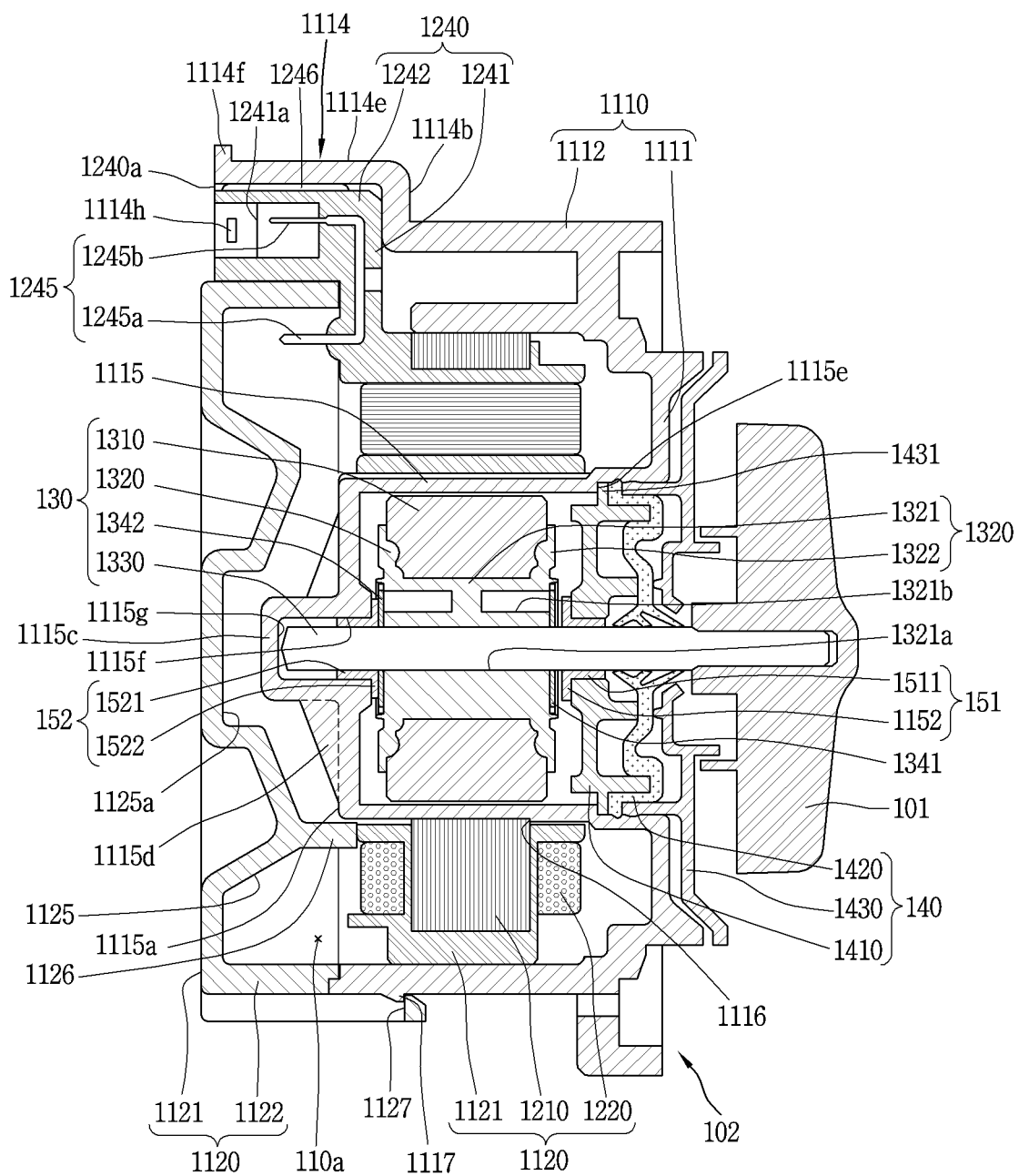
FIG. 5 is a cross-sectional view illustrating an inside of an example pump assembly.

In some implementations, the drain pump 71 may be installed below the drum 50. FIGS. 3 and 4 are exploded perspective views of an example pump assembly viewed from an example impeller side and an example motor housing side, respectively, and FIG. 5 is a cross-sectional view illustrating an inside of the pump assembly.

As shown in these drawings, the pump assembly 100 according to this implementation includes a motor housing 110 forming an outer appearance of the pump assembly 100, and a driving unit M disposed inside the motor housing 110 for generating a rotational force for rotating the impeller 101.

The motor housing 110 may include a first housing 1110 and a second housing 1120 coupled to the first housing 1110. Opening-side edge surfaces are formed on one side of the first housing 1110 and one side of the second housing 1120, respectively. The opening-side edge surfaces of the first housing 1110 and the second housing 1120 may be coupled to each other in a facing manner so as to seal a motor accommodation space 110a, in which a stator 120 to be explained later is installed.

The first housing 1110 is formed in a cap cross-sectional shape having an inner space at one side. For example, the first housing 1110 includes a first sealing surface 1111 forming one axial side surface, and a first sidewall surface 1112 extending cylindrically from an outer circumferential surface of the first sealing surface 1111.

The first sealing surface 1111 is provided with the plurality of protrusions 1111a which is circumferentially formed on the circumferential surface facing the pump casing 75. Accordingly, the first housing 1110 may be coupled to the protrusions 75e of the pump casing 75 in an engaging manner.

A rotor accommodating portion 1115 is formed at a central portion of the first sealing surface 1111 in a manner of being recessed in a first axial direction opposite to the impeller 101. The rotor accommodating portion 1115 may be recessed appropriately by a height of the first sidewall surface 1112.

The rotor accommodating portion 1115 has a shape in which a first axial side surface 1115a facing the second housing 1120 is closed but a second axial side surface facing the opposite impeller 101 is opened. An outer circumferential surface forming a side surface of the rotor accommodating portion 1115 in the circumferential direction, an inner surface of the first sealing surface 1111, and an inner circumferential surface of the first sidewall surface 1112 form a part of the motor accommodating space 110a, which is an inner surface of the casing main body 75a, together with an inner surface of a second sealing surface 1121 and an inner circumferential surface of the second sidewall surface 1122 forming the second housing 1120 to be explained later.

Here, the rotor accommodating portion 1115 may be formed so that a thickness of a circumferential side surface is thinner than a thickness of a closed axial side surface. Accordingly, an interval between the rotor 130 and the stator 120 which are disposed with interposing the circumferential side surface of the rotor accommodating portion 1115 therebetween can be reduced, thereby improving motor efficiency.

The stator 120 of the pump motor 102 is fixedly coupled to an outside of the rotor accommodating portion 1115 in an inserting manner, and the rotor 130 of the pump motor 102 is rotatably inserted into the rotor accommodating portion 1115. Accordingly, the stator 120 and the rotor 130 are disposed at an outside and an inside with the rotor accommodating portion 1115 of the first housing 1110 interposed therebetween. The stator 120 and the rotor 130 are disposed in approximately the same axial height range.

A fixing rib 1115b is formed long in an axial direction on the outer circumferential surface of the rotor accommodating portion 1115. The fixing rib 1115b is located between teeth (precisely, pole portions extending from the teeth) of a stator core 1210 to be explained later. The fixing rib 1115b is inserted between the teeth 1212 of the stator 120 to prevent the stator 120 from moving in the circumferential direction. The fixing rib 1115b is provided in plurality as many as the number of teeth 1212 at predetermined intervals along the circumferential direction.

However, even at least one fixing rib 1115b can prevent the rotation of the stator 120. However, when there is only one fixing rib 1115b, a thickness of a sidewall portion of the rotor accommodating portion 1115 may be uneven in the circumferential direction, and deformation may occur accordingly. In some implementations, the fixing ribs 1115b may be arranged at predetermined intervals along the circumferential direction. In some examples, the fixing ribs 1115b may have the same shape and size because such structures can prevent the deformation of the rotor accommodating portion 1115 during injection molding of the first housing 1110.

A first support protrusion 1116 may be formed on the outer circumferential surface of the rotor accommodating portion 1115, to support one side surface of the stator 120 in the axial direction, namely, a second axial side surface of the stator core 1210 facing the impeller 101 in the second axial direction. The first support protrusion 1116 may have a stepped recess shape recessed by a predetermined length from the first axial side surface 1115a of the rotor accommodating portion 1115 to an opposite side in the axial direction or have a protrusion shape protruded by a predetermined height at a stepped position. The first support protrusion 1116 may be formed by respectively connecting the neighboring fixing ribs 1115b in the circumferential direction.

The rotor accommodating portion 1115 may be provided with a bearing portion 1115c protruding in a first axial direction from an outer bottom surface 1115a forming an axial surface to support the rotary shaft 1330, and a plurality of reinforcing ribs 1115d extending from the outer bottom surface 1115a of the rotor accommodating portion 1115 and the outer circumferential surface of the bearing portion 1115c and protruding in a radial direction.

In some examples, only one reinforcing rib 1115d may be provided. In other examples, the reinforcing rib 1115d may be provided in a plurality with uniform intervals along the circumferential direction in order to uniformly reinforce strength of the bearing portion 1115c.

Also, the reinforcing rib 1115d may be inclined from the outer bottom surface 1115a of the rotor accommodating portion 1115 toward an end of the bearing portion 1115c. That is, the reinforcing rib 1115d may be formed to have a smaller cross-sectional area from the outer bottom surface 1115a of the rotor accommodating portion 1115 toward the end of the bearing portion 1115c.

Further, the plurality of reinforcing ribs 1115d may be formed at equal intervals along the circumferential direction, or may extend along the circumferential direction into one annular shape. However, when the reinforcing rib is formed into the one annular shape, a thickness at the reinforcing rib 1115d may increase. In some implementations, the reinforcing rib 1115d may be disposed at a root portion where the bearing portion 1115c starts. Further, the reinforcing rib 1115d may be formed to be inclined or curved. In some cases, where the plurality of reinforcing ribs 1115d are arranged along the circumferential direction, each of the reinforcing ribs 1115d may be disposed between the neighboring fixing ribs 1115b, for example, in the range of each tooth 1212 of the stator 120 in the circumferential direction.

If the reinforcing ribs 1115d and the fixing ribs 1115b are located on the same line in the radial direction and connected to each other, portions where the reinforcing ribs and the fixing ribs 1115b are formed during the injection molding of the first housing 1110 become thicker than other portions. Then, when the first housing 1110 is cooled after being injected, they may be shrunk and deformed. In some implementations, the reinforcing ribs 1115d and the fixing ribs 1115b may be located on different lines in a spacing manner along the radial direction. In some implementations, the reinforcing ribs 1115d and the fixing ribs 1115b may be arranged in a spacing manner in which they are located on the same line in the radial direction.

In some examples, the reinforcing ribs 1115d may have the same length in the radial direction because the deformation of the rotor accommodating portion 1115 during the injection molding of the first housing 1110 can be prevented as described above. However, the reinforcing ribs 1115d may also be formed to have different lengths. In this case, the reinforcing ribs 1115d having the different lengths are alternately arranged at regular intervals. For example, relatively short second reinforcing ribs may alternately be arranged between relatively long first reinforcing ribs. The first reinforcing ribs 1115d may be located between the fixing ribs 1115b and the second reinforcing ribs may be formed on the same radial line as the fixing ribs 1115b. In this case, the first and second reinforcing ribs may be spaced apart from the fixing ribs 1115b.

As such, as the reinforcing ribs 1115d are inclinedly formed on the outer circumferential surface of the bearing portion 1115c, an inner circumferential surface of an annular protrusion 1125 provided on the second sealing surface 1121 of the second housing 1120 to be explained later may be inclined to correspond to the reinforcing ribs 1115d. This will be described again together with the second housing.

In some implementations, a mounting surface 1115e where a sealer 140 to be explained later is disposed is formed in a stepped manner on the inner circumferential surface of the rotor accommodating portion 1115 around an open end. A bearing groove 1115f is formed in a center of the bottom surface of the rotor accommodating portion 1115 so that an end portion of the rotary shaft 1330 of the rotor 130 can be inserted. A lubricant storage space 1115g in which a predetermined amount of lubricant can be stored may be formed between a bottom surface of the bearing groove 1115f and the end portion of the rotary shaft 1330.

A plurality of hook protrusions 1117 (three in the drawing, for example) is formed along the circumferential direction on the outer circumferential surface of the first sidewall surface 1112 forming the side surface of the first housing 1110. The hook protrusions 1117 are engaged with hooking grooves 1127 of the second housing 1120 to be described later.

Guide ribs 1118 having a predetermined height may be formed on both sides of the hook protrusion 1117. The guide ribs 1118 may be formed at positions where circumferential side surfaces thereof are slidably brought into contact with circumferential side surfaces of the hooking grooves 1127. Thus, when the hooking groove 1127 is pushed and inserted into the hook protrusion 1117, the hooking groove 1127 can maintain its position.

In some implementations, the guide ribs 1118 may have a height and a width which are high and wide enough to serve as a handle when the motor housing 110 is rotated to engage the stopping portions 1111a of the motor housing 110 with the protrusions 75e of the pump casing 75. This may prevent an operator from applying an excessive force to the hooking groove 1127 or a connector 1240 to be described later, thereby preventing the hooking groove 1127 and the connector 1240 from being damaged.

A first stepped portion 1112a may be formed along a circumferential direction on the opening-side edge surface of the first sidewall surface 1112 forming an edge of the first housing 1110. The first stepped portion 1112a may be formed to be engaged with a second stepped portion 1122a formed on the opening-side edge surface of the second housing 1120, which will be described later.

A connector mounting groove 1112a is formed at the opening-side edge surface of the first housing 1110 so that the connector 1240 is inserted. The connector mounting groove 1112a is formed to be recessed toward the impeller 101 by a predetermined depth from the opening-side edge surface of the first sidewall surface 1112 in the second axial direction. In some implementations, the connector mounting groove may be formed on the opening-side edge surfaces of the first housing 1110 and the second housing 1120 in half, respectively. The connector mounting groove will be described later.

In some implementations, the second housing 1120 includes a second sealing surface 1121 formed in a disk shape, and a second sidewall surface 1122 extending cylindrically from the second sealing surface 1121.

The second sealing surface 1121 forms one axial side surface of the second housing 1120 and covers the opening of the first housing 1110 to seal the motor accommodating space 110a. An inner surface of the second sealing surface 1121 may be formed flat, but may also be provided with the annular protrusion 1125 as described above.

The annular protrusion 1125 protrudes toward the stator 120. The annular protrusion 1125 may protrude to be as close as possible to the side surface of the stator core 1210 in view of minimizing a height of the second support protrusion 1126 to be described later.

The annular protrusion 1125 may protrude in the axial direction so that its outer circumferential surface or inner circumferential surface is orthogonal to the sealing surface of the second housing. However, since the reinforcing ribs 1115d are inclinedly formed on the outer circumferential surface of the bearing portion 1115c, at least the circumferential surface of the annular protrusion 1125 may be inclined in a direction corresponding to the reinforcing ribs 1115*d* so as to maintain a predetermined interval from an outer surface of the reinforcing ribs 1115*d*.

In some implementations, an outer circumferential surface of the annular protrusion 1125 may be inclined in an opposite direction to the inner circumferential surface to prevent deformation of the annular protrusion 1125.

A recess portion 1125*a* may be formed in a central portion of the annular protrusion 1125 to receive the bearing portion 1115*c* of the rotor accommodating portion. The recess portion 1125*a* may extend from the inner circumferential surface of the annular protrusion 1125. Accordingly, the inner circumferential surface of the annular protrusion 1125 may be shorter than the outer circumferential surface thereof and an outer bottom surface of the recess portion 1125*a* may have the same height as the sealing surface 1121 of the second housing 1120.

In some examples, the second support protrusions 1126 may be formed on a stator-side end portion of the annular protrusion 1125. The second support protrusions 1126 may protrude toward the stator core 1210 by a predetermined height.

The second support protrusions 1126 may have a height high enough to contact and support the first axial surface at the inner circumferential side of the stator. The height of the second support protrusion 1126 may be as low as possible to prevent buckling of the second support protrusions 1126. For example, an axial height of the second support protrusion 1126 may be lower than or equal to an axial height of the annular protrusion 1125.

Here, the second support protrusion 1126 may be formed such that its end portion protrudes a predetermined height higher than the opening-side edge surface of the second housing 1120. Accordingly, the second support protrusion 1126 further pushes up the stator 120 toward the first housing 1110 in a state where the first housing 1110 and the second housing 1120 are coupled to each other, such that the stator 120 can be more closely attached to the first support protrusion 1116.

The second support protrusions 1126 may be located at the same interval along the circumferential direction. Accordingly, the stator 120 can be stably supported by the plurality of second support protrusions 1126 uniformly applying power thereto along the circumferential direction.

In addition, the plurality of hooking grooves 1127 may be formed along the circumferential direction on the opening-side edge surface of the second sidewall surface 1122 as described above. The hooking groove 1127 is hooked on the hook protrusion 1117 of the first housing 1110 so that the first housing 1110 and the second housing 1120 can be maintained in the coupled state.

The second stepped portion 1122*a* may be formed along the circumferential direction on the opening-side edge surface of the second sidewall surface 1122. The second stepped portion 1122*a* is formed to engage with the first stepped portion 1112*a* formed on the opening-side edge surface of the first housing 1110 described above. Thus, the opening-side edge surface of the first housing and the opening-side edge surface of the second housing can be more tightly sealed by an increased sealing area.

In some implementations, the first housing 1110 and the second housing 1120 may be ultrasonically welded onto each other. To this end, the first stepped portion 1112*a* may be provided with a welding protrusion that is bonded to the second stepped portion 1122*a* while being melted by ultrasonic vibration during ultrasonic welding. The welded protrusion may be formed on the second stepped portion 1122*a* or may be formed on each of the first stepped portion 1112*a* and the second stepped portion 1122*a*.

Furthermore, the opening-side edge surface of the first housing 1110 and the opening-side edge surface of the second housing may be formed in a flat shape without a step. In this case as well, the opening-side edge surfaces of the first housing and the second housing 1120 may be provided with the welding protrusions, respectively, such that those opening-side edge surfaces can be ultrasonically welded on each other. Of course, other bonding agent or adhesive other than the ultrasonic welding may be used.

In some implementations, the driving unit may include a stator 120 and a rotor 130.

The stator 120 may include a stator core 1210, coils 1220, and an insulator 1230.

The stator core 1210 is formed such that a plurality of stator sheets having a plurality of slots 1211 and teeth 1212 are stacked into a cylindrical shape along the circumferential direction. The coil 1220 is wound on the teeth 1212 between the slots 1211 of the stator core 1210. An insulator 1230 is interposed between the stator core 1210 and the coils 1220 to perform insulation.

An inner circumferential surface of the stator 120 is inserted into the outer circumferential surface of the rotor accommodating portion 1115 provided in the first housing 1110, and one side surface of the stator 120, that is, a second axial side surface of the stator core 1210 is supported in a second axial direction by the first support protrusion 1116 provided on the outer circumferential surface of the rotor accommodating portion 1115 of the first housing 1110. Another side surface of the stator 120, that is, a first axial side surface of the stator core 1210 is supported in a first axial direction by the second support protrusions 1126 provided on the inner surface of the second sealing surface 1121.

The inner circumferential surface of the stator core 1210 is supported in the circumferential direction as the slots 1211 of the stator core 1210, namely, the slits between the teeth (precisely, pole portions) are inserted into the fixing ribs 1115*b* provided on the outer circumferential surface of the rotor accommodating portion 1115.

In some implementations, the rotor 130 includes a magnet 1310, a rotor cover 1320 for covering and supporting both axial side surfaces of the magnet 1310, a rotary shaft 1330 inserted into a center of the rotor cover 1320, and a plurality of washers 1341, 1342 covering both axial sides of the rotor cover 1320.

The magnet 1310 is formed in an annular shape. An outer circumferential surface of the magnet 1310 is exposed, and the rotor cover 1320 made of resin is filled in an inner circumferential surface of the magnet 1310 in an insert-molding manner. Both axial side surfaces of the magnet 1310 are axially supported by a second support portion 1322 of the rotor cover 1320 to be described later.

The rotor cover 1320 is formed in a manner of being insert-molded in the magnet 1310 with the rotary shaft 1330 inside thereof. The rotor cover 1320 may include a first support portion 1321 that fills the inner circumferential surface of the magnet 1310 and supports the rotary shaft 1330, and a plurality of second support portions 1322 that extends from both outer circumferential surfaces of the first support portion 1321 in the axial direction to support both axial side surfaces of the magnet 1310.

The first support portion 1321 may be formed in a cylindrical shape, and a shaft hole 1321*a* may be formed in a center thereof such that the rotary shaft 1330 is inserted and coupled. A weight-reducing groove 1321*b* for reducing a weight of the rotor 130 and simultaneously reducing injection deformation may be formed at the outside of the shaft hole 1321a.

The weight-reducing groove 1321b may be provided in plurality at the outside of the shaft hole with predetermined intervals along the circumferential direction. The weight-reducing grooves 1321b may be formed in a penetrating manner along the axial direction. However, the weight-reducing grooves 1321b may be recessed by a predetermined depth from both axial side surfaces so as to stably support the rotary shaft 1330.

In some implementations, the second support portions 1322 are formed in a flange shape extending in the radial direction from outer circumferential surfaces of both axial ends of the first support portion 1321. Annular grooves 1322a which are located at positions with predetermined intervals from outer circumferential surfaces of a first washer 1341 and a second washer 1342, which will be explained later, may be formed on axial outer surfaces of the second support portion 1322, namely, side surfaces facing a first bearing 151 and a second bearing 152 to be explained later.

The annular grooves 1322a are grooves formed in the course of fixing the first washer 1341 and the second washer 1342. Lubricant may be stored in the annular grooves 1322a. The lubricant may be scattered while the rotor 130 rotates, so as to lubricate between the first bearing 151 and the rotary shaft.

An axial depth of the annular grooves 1322a may be greater than or equal to a thickness of the first washer 1341 and the second washer 1342. To this end, the thickness of the second support portion 1322 may be set to be equal to or greater than the thickness of the first washer 1341 or the second washer 1342 in terms of stably fixing the first washer 1341 and the second washer 1342. The second support portion will be described later with the washer.

In some implementations, the rotary shaft 1330 may be made of a metal material and is inserted through the shaft hole 1321a of the rotor cover 1320 at the center of the magnet.

A first end of the rotary shaft 1330 is rotatably inserted through the sealer 140 to be coupled to the impeller 101. A second end of the rotary shaft 1330 is rotatably coupled to the bearing portion 1115c. The second end of the rotary shaft 1330 and a bottom surface of the bearing portion 1115c may be curved to prevent abrasion between the rotary shaft 1330 and the bearing portion 1115c.

The rotary shaft 1330 is radially supported by the first bearing 151 and the second bearing 152 to prevent abrasion of the rotary shaft 1330 during rotation thereof. The first bearing 151 is inserted into a sealing base 1410 to be described later, and the second bearing 152 is inserted into the bearing groove 1115f of the rotor accommodating portion 1115 forming the bearing portion 1115c.

Both the first bearing 151 and the second bearing 152 are made of a bush bearing. However, each of the first bearing 151 and the second bearing 152 is provided with a cylindrical portion 1511, 1521 forming a radial bearing portion, and a flange portion 1512, 1522 forming an axial bearing portion. One end portion of the rotary shaft 1330 is inserted into the cylindrical portion 1511, 1521 forming the radial bearing portion so as to support the rotor 130 in the radial direction and another end portion of the rotary shaft 1330 is inserted into the flange portion 1512 forming the axial bearing portion so as to support both axial side surfaces of the rotor 130 in the axial direction.

In this instance, as the first bearing 151 and the second bearing 152 are formed of a metal material, the first washer 141 and the second washer 142 are provided on both axial side surfaces of the rotor 130 that the flange portion 1512 of the first bearing 151 and the flange portion 1522 of the second bearing 152 face.

The first washer 1341 and the second washer 1342 serve to prevent abrasion of the rotor due to friction between the rotor cover 1320 and the bearings 151 and 152 when both side surfaces of the rotor cover 1320 are brought into contact directly with the first bearing 151 and the second bearing 152. Accordingly, the first washer 1341 and the second washer 1342 can be formed of a metal material having higher rigidity than the rotor cover 1320 made of resin.

The first washer 1341 and the second washer 1342 are formed in the same shape and assembled. For example, the first washer 1341 is formed in a circular plate shape having an area capable of supporting the magnet 1310 in the axial direction by covering the weight-reducing groove 1321b, and is provided with at least one fixing groove 1341a formed along an outer circumferential surface thereof.

The rotor cover 1320 is inserted into the fixing groove 1341a. For this, the second support portion 1322 of the rotor cover 1320 may be provided with a fixing protrusion 1322a annularly formed along the outer circumferential surface of the first washer 1341. Heat may be applied to the fixing protrusion 1322a, such that the fixing protrusion 1322a can permeate into the fixing groove 1341a while being melted toward the first washer 1341.

As described above, since the second support portion 1322 of the rotor cover 1320 and the first washer 1341 are formed at the same height, the size of the magnet 1310 can be maximized, and thus a motor capacity with respect to the same motor size can be increased.

Since the second washer 1342 is formed in the same shape as the first washer 1341 and assembled, a description thereof will be omitted.

In some examples, a sealer 140 may be installed at the outside of the rotor 130, namely, between the rotor 130 and the impeller 101 to prevent separation of the rotor from the rotor accommodating portion 1115 and simultaneously preventing permeation of washing water into the rotor 130.

The sealer 140 may include a sealing base 1410, a sealing member 1420, and a sealing cover 1430.

The sealing base 1410 is rotatably coupled to the rotary shaft 1330 of the rotor 130. The sealing member 1420 is placed on the sealing base 1410 in a manner that an outer circumferential surface thereof is in contact with the inner circumferential surface of the rotor accommodating portion 1115 in a sealed state. The sealing cover 1430 is coupled to the sealing base 1410 by pressing the sealing member 1420 such that the sealing member 1420 can be fixed to the sealing base 1410.

In some implementations, in replacement of the sealer, a rotor support protrusion which is capable of supporting the rotor in the axial direction may protrude from the rotor accommodating portion 1115 of the first housing 1110 in the radial direction.

Hereinafter, a process of draining washing water in the washing machine provided with the drain pump according to the present disclosure will be described.

That is, when power is applied to the coils 1220 of the stator 120 constituting the pump assembly 100 in response to the start of a drain stroke in the washing machine, the rotor 130 is rotated by interaction between the coils 1220 of the stator 120 and the magnet 1310 of the rotor 130. When the rotor 130 is rotated, the impeller 101 coupled to the rotary shaft 1330 of the rotor 130 is rotated.

Washing water in the tub 30 then flows into the drain pump 71 through the first drain pipe 72a and the water inlet pipe 75b. The washing water is forcibly discharged into the water outlet pipe 75c by the impeller 101.

Then, the washing water discharged to the water outlet pipe 75c is discharged to the outside of the cabinet along the second drain pipe 72a and the third drain pipe 72c.

In some implementations, as described above, the drain pump 71 is installed at the bottom of the drum 50, that is, adjacent the bottom surface of the lower end portion of the cabinet 10. Accordingly, water leaked from the drum 50 may be brought into contact with the drain pump 71, or water that is dripped by a water overflow from the detergent supply portion 63 may be brought into contact with the drain pump 71. Such water may then be introduced into the drain pump 71, damaging the pump assembly 100 or drastically reducing efficiency of the pump assembly 100.

In some implementations, in the drain pump 71, the sealed state of the pump assembly 100 may be tightly maintained to prevent the water from flowing into the pump assembly 100, to improve the efficiencies of the pump assembly 100 and the washing machine. For example, as the contact surface the connector 1240 which is connected to an external power source is exposed, water may be introduced into the pump assembly 100, namely, the motor housing 110 through a gap between the contact surface of the connector 1240 and the motor housing 110.

In this implementation, a connector cover portion may be provided on the outer surface of the motor housing to surround the connector protruding to the outside of the motor housing. The connector cover portion may be provided on the first housing or on the second housing. In some cases, the connector cover portion may also be formed on the first housing and the second housing in half, respectively. Hereinafter, an example in which the connector cover portion is provided on the first housing will be described.

Figure 6:
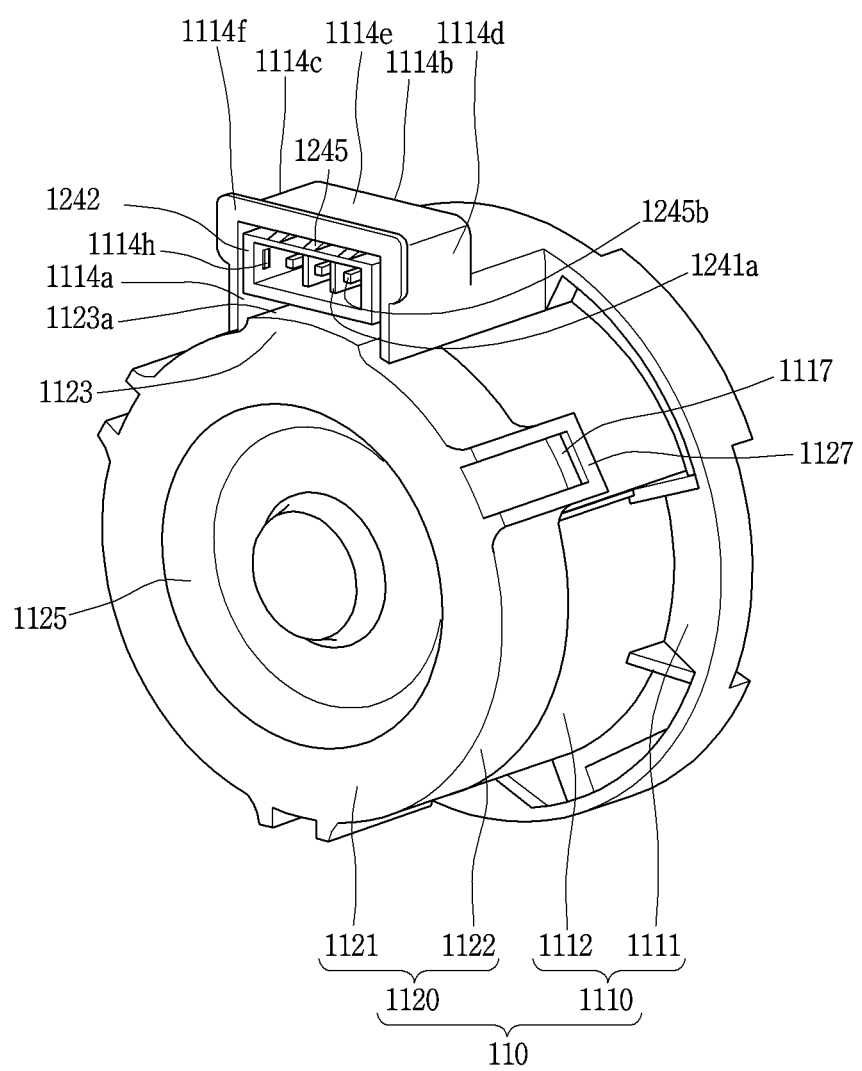
FIG. 6 is a perspective view illustrating an example pump assembly including an example connector and an example motor housing.
Figure 7:
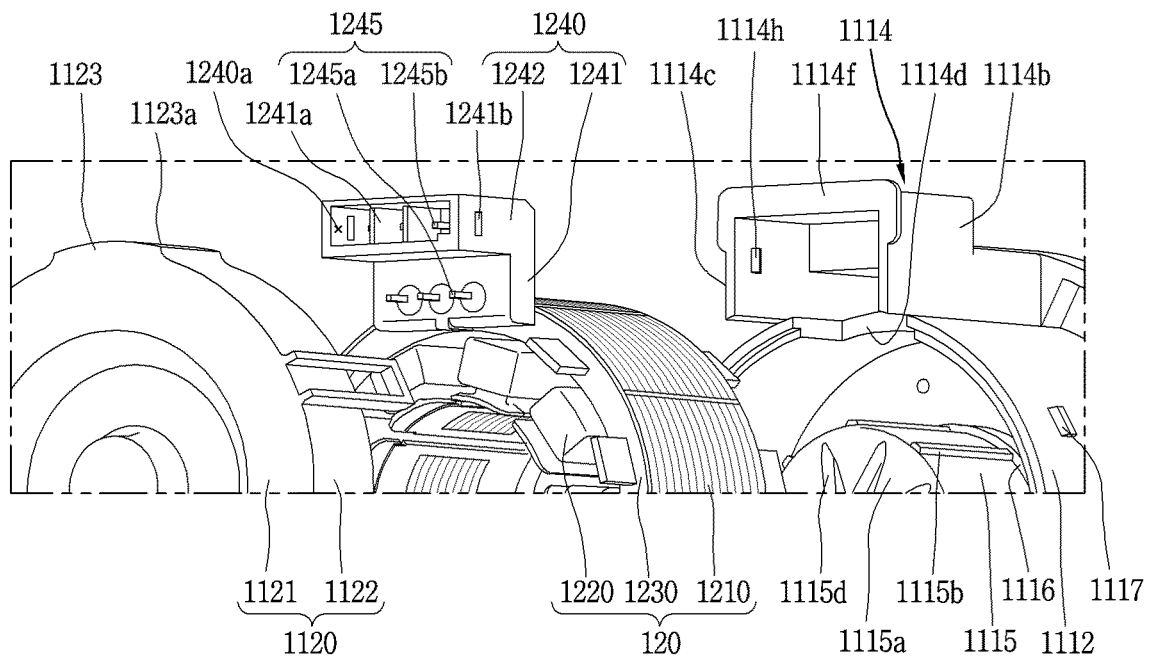
FIG. 7 is a perspective view illustrating the connector of FIG. 6 in a state separated from an example connector cover portion.
Figure 8:
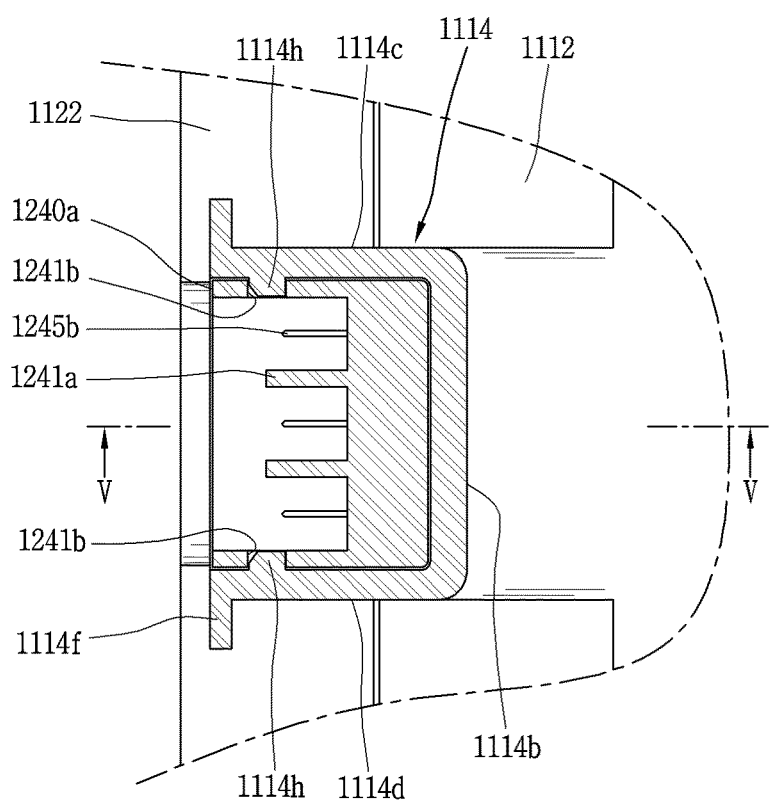
FIG. 8 is a planar view illustrating the connector cover portion of FIG. 7 in a cut state.
Figure 9:
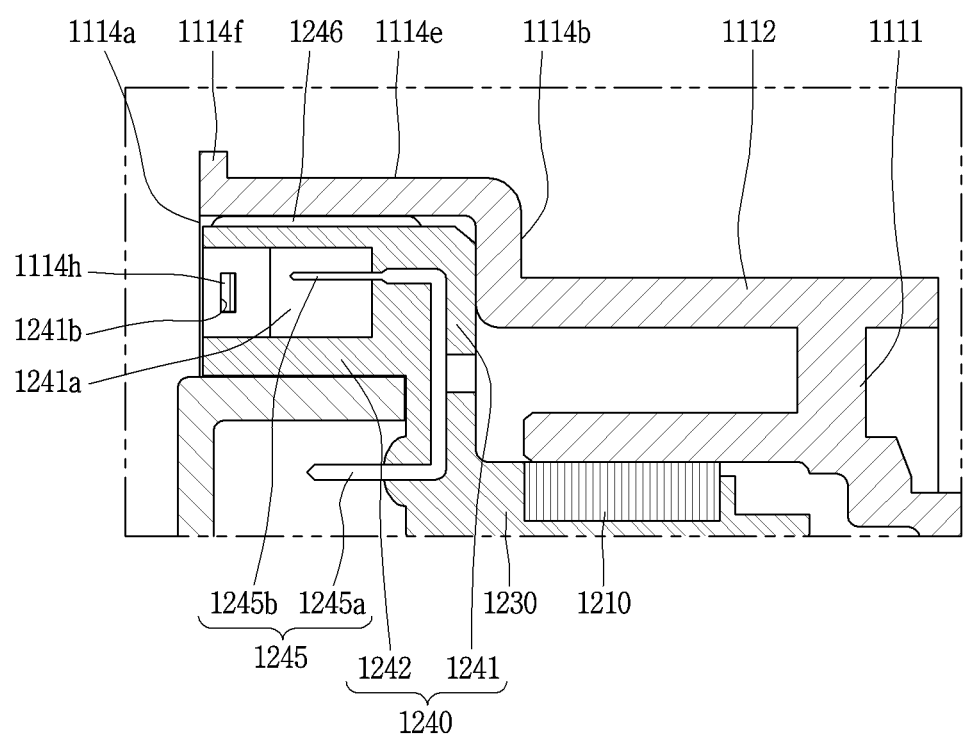
FIG. 9 is a sectional view taken along the line V-V' of FIG. 8.

FIG. 6 is a perspective view illustrating an example pump assembly including a connector, viewed from an example motor housing side, FIG. 7 is a perspective view illustrating the connector of FIG. 6, separated from an example connector cover portion, FIG. 8 is a planar view of the connector cover portion of FIG. 7 in a cut state, and FIG. 9 is a sectional view taken along the line V-V' of FIG. 8.

Referring back to FIGS. 3 to 5, in the pump assembly 100 according to this implementation, the connector 1240 may be formed such that a contact surface 1240a which is exposed to the outside of the motor housing 110 to be electrically connected to the external power source is arranged in the first axial direction opposite to the impeller 101. Of course, the contact surface 1240a may be variously positioned depending on an installation direction of the pump assembly 100. However, it is advantageous that the contact surface 1240a is located to face a direction approximately orthogonal to a dropping direction of water, in terms of preventing the penetration of water.

The connector 1240 extends from the insulator 1230 surrounding the stator core 1210 and may include a first connector portion 1241 and a second connector portion 1242. The first connector portion 1241 may extend from one side of the stator 120 in the axial direction toward an outer circumferential surface of the stator 120, and the second connector portion 1242 may extend from the first connector portion 1241 with the impeller 101 at the back (opposite to or away from the impeller), namely, the first axial direction.

The first connector portion 1241 may be provided with a plurality of first terminal portions 1245a to be explained later, which extends in the first axial direction, and the second connector portion 1242 may be provided with a plurality of second terminal portions 1245b to be explained later, which extends in the first axial direction. The first connector portion 1241 is provided with a first partitioning protrusion 1241a to partition the plurality of first terminal portions 1245a. Thus, a sealing effect from an external terminal connected to the second terminal portion 1245b can be improved.

The second connector portion 1242 may have a rectangular cross-sectional shape that is long in a transverse direction when projected in the first axial direction. Hook holes 1241b may be formed on both side surfaces of the second connector portion 1242 in the circumferential direction, so that fixing protrusions 1114h provided on side surfaces of a connector cover portion 1114 to be described later can be inserted. Accordingly, the connector 1240 can be tightly coupled to the connector cover portion 1114.

The connector 1240 is provided with a terminal 1245 for connecting the external power source and the coils 1220. The terminal 1245 is provided in plurality (three in case of three phases as illustrated in the drawing) arranged at predetermined intervals in a transverse direction. The plurality of terminals is positioned on the same line in the transverse direction.

Each of the terminals 1245 includes a first terminal portion 1245a located in the motor accommodation space 110a and a second terminal portion 1245b extending from the first terminal portion 1245a and located outside the motor accommodation space 110a. The first terminal portion 1245a extends from the first connector portion 1241 in the first axial direction and the second terminal portion 1245b extends from the second connector portion 1242 in the first axial direction.

In some implementations, the first housing 1110 is provided with a connector mounting groove 1112a formed on the sidewall surface 1112 thereof so that the connector 1240 is inserted therein to be exposed outside of the motor accommodating space 110a of the motor housing 110. The connector mounting groove 1112a is formed to be engraved into the opening-side edge surface of the first housing 1110 by a predetermined depth in the direction toward the impeller 101, that is, the second axial direction. The connector mounting groove 1112a is formed to have substantially the same shape as the outer shape of the connector 1240 in the radial direction, more precisely, the cross-sectional shape of the first connector portion 1241.

For example, as illustrating in FIG. 7, the connector mounting groove 1112a may be engraved into the opening-side edge surface of the first housing 1110 by a thickness of the first connector portion 1241. However, in some cases, the connector mounting groove 1112a may also be formed radially through the sidewall surface 1112 of the first housing 1110.

The connector cover portion 1114 may extend from an outer circumferential surface of the sidewall surface 1112 of the first housing 1110, namely, a circumferential surface of the connector mounting groove 1112a to protrude toward the outer circumferential surface, and thus accommodate the connector mounting groove 1112a.

The connector cover portion 1114 may be formed to surround all surfaces except for the contact surface 1240a of the connector 1240. For example, when a surface of the connector cover portion 1114 corresponding to the contact surface 1240a of the connector 1240 is referred to as a first axial side surface 1114a, a second axial side surface 1114b which is opposite to the first axial side surface 1114a, first and second circumferential side surfaces 1114c and 1114d which are both side surfaces in the circumferential direction, and a radial side surface 1114e which connects the second axial side surface 1114b and the first and second circumferential side surfaces 1114c and 1114d so as to form an outer circumferential surface define closed surfaces, and the first axial side surface 1114a defines an open surface. The first axial side surface 1114a is a surface which is located with the impeller to its back, and the second axial side surface 1114b is a surface facing the impeller.

As illustrating in FIGS. 7 to 9, the connector cover portion 1114 may be provided with a water blocking protrusion 1114f formed on an outer surface thereof to prevent water to be dripped from flowing toward the open surface of the connector cover portion 1114, namely, the first axial side surface 1114a. The water blocking protrusion 1114f may be formed along both the first and second circumferential side surfaces 1114c and 1114d and the radial side surface 1114e forming the closed surfaces, but in some cases, may be formed only on one side surface. In some examples, the water blocking protrusion 1114f may be disposed on the only one side surface, for example, in a direction in which water is dripped.

The water blocking protrusion 1114f may protrude by a predetermined height along a circumference of an end portion of the outer circumferential surface of the connector cover portion 1114 at the side of the open surface. Accordingly, water which is dripped to the radial side surface 1114e of the connector cover portion 1114 can be blocked by the water blocking protrusion 1114f so as to be prevented from flowing toward the open surface of the connector cover portion 1114. This may result in effectively preventing the water from being introduced between the connector cover portion 1114 and the connector 1240.

Figure 10:
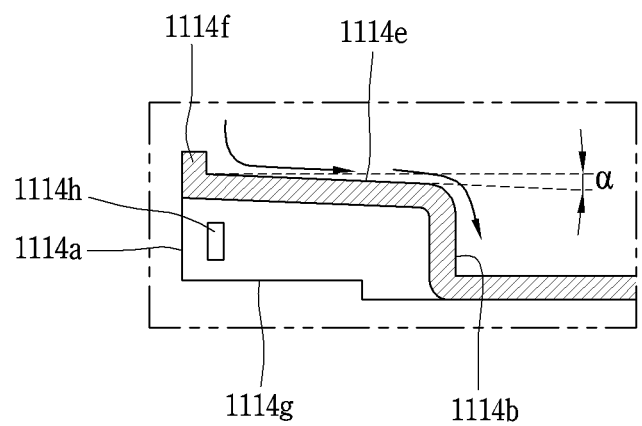
FIG. 10 is a lateral sectional view illustrating an example outer surface of an example connector cover portion.
Figure 11:
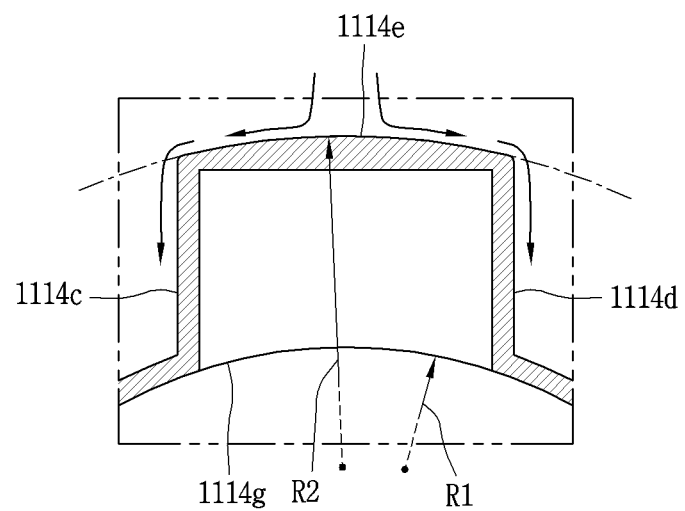
FIG. 11 is a front sectional view illustrating an example outer surface of an example connector cover portion.

FIGS. 10 and 11 are lateral and front sectional views illustrating an outer surface of an example connector cover portion.

For example, as illustrating in FIG. 10, the radial side surface 1114e of the outer side surface of the connector cover portion 1114 may be formed to be inclined such that its height is lowered by a predetermined angle α from the water blocking protrusion 1114f to an opposite direction. Accordingly, the water dropped to the radial side surface 1114e of the connector cover portion 1114 may flow opposite to the open surface of the connector cover portion 1114, so as to be effectively prevented from being introduced between the connector cover portion 1114 and the connector 1240.

Alternatively, as illustrating in FIG. 11, the radial side surface 1114e of the connector cover portion 1114 may be curved or inclined so as to have a height even in the circumferential direction. For example, the radial side surface 1114e of the connector cover portion 1114 may be formed as a curved surface having a predetermined curvature R2 (for example, a curvature equal to a curvature R1 of the sidewall surface of the first housing). Then, a center of the radial side surface 1114e of the connector cover portion 1114 may be the highest and both ends thereof may be the lowest.

Accordingly, water which is dripped to the outer surface of the connector cover portion 1114 may flow down to both sides of the connector cover portion 1114 along the radial side surface 1114e which is formed as the curved or inclined surface. This may result in effectively preventing the water from being introduced between the connector cover portion 1114 and the connector 1240.

Also, the connector cover portion 1114 may be provided or assembled to be located at the uppermost point of the drain pump 71 so that water to be dripped can flow down. However, the position of the connector cover portion 1114 is not necessarily limited to the uppermost point, but the connector cover portion 1114 may alternatively be formed or assembled to be located at an upper half portion.

In addition, the connector cover portion 1114 extends to protrude longer in the first axis direction than the opening-side edge surface of the first housing 1110. Accordingly, a part of the inner surface of the connector cover portion 1114 is opened while forming the connector mounting groove 1112a described above, and the remaining part is located outside the opening-side edge surface of the first housing 1110, thereby forming an inner open surface 1114g.

A part of the inner surface of the connector 1240 inserted into the connector mounting groove 1112a is radially exposed by the inner open surface 1114g. Water to be dripped may be introduced through the inner open surface 1114g so as to permeate into the motor housing 110 through the connector mounting groove 1112a.

The sidewall surface 1122 of the second housing 1120 may be coupled to the inner open surface 1114g of the connector cover portion 1114 in an overlapping manner in the axial direction. Thus, the inner surface 1240b of the connector 1240 inserted into the connector cover portion 1114 may be closely adhered or located adjacent to the sidewall surface 1122 of the second housing 1120. Most of water dripped to the outer circumferential surface of the sidewall surface 1122 of the second housing 1120 can thus flow down without permeating between the connector 1240 and the second housing 1120.

However, a radial thickness H2 of the connector 1240 may be lower than an inner height H1 of the first and second circumferential side surfaces 1114c and 1114d of the connector cover portion 1114, with respect to the inner surface 1240b of the connector 1240. A gap may be formed between the inner surface 1240b of the connector 1240 and the sidewall surface 1122 of the second housing 1120 and water may be introduced between the connector 1240 and the second housing 1120 through the gap.

Figure 12:
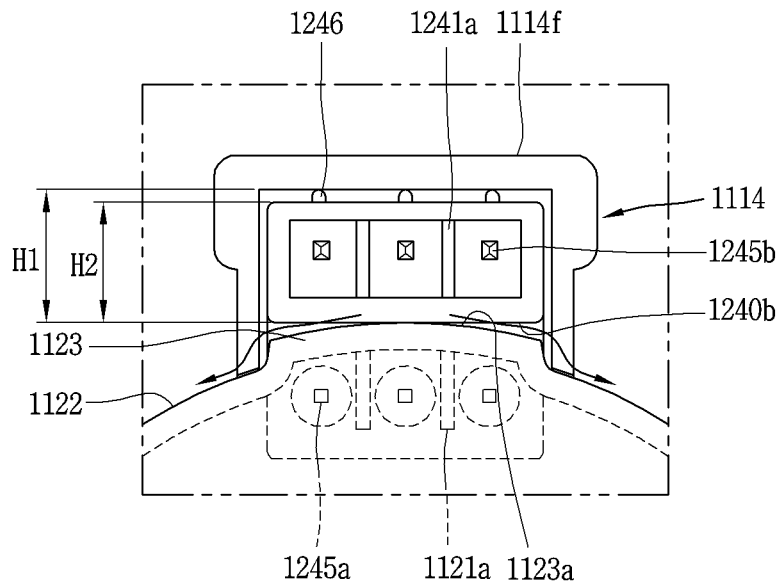
FIGS. 12 and 13 are front views illustrating an example sealing protrusion.
Figure 13:
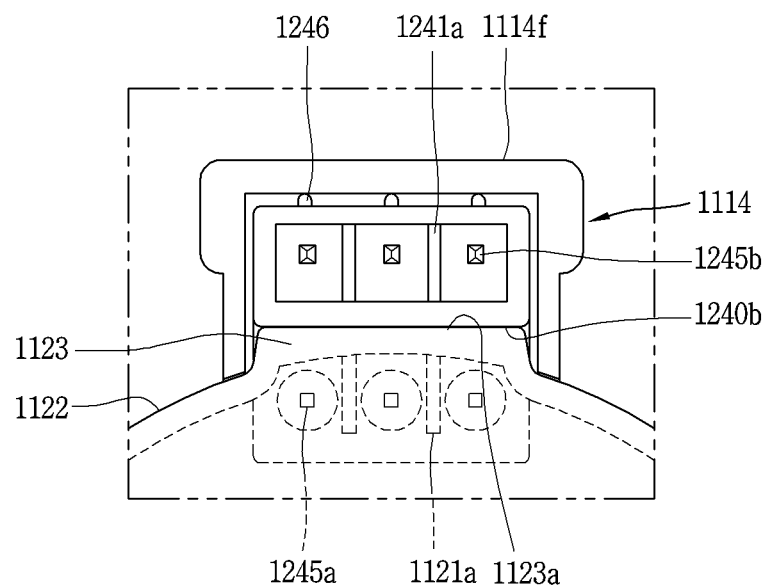

In view of this, in this or other implementations, a sealing protrusion may protrude from a portion of the sidewall surface of the second housing, which is accommodated in the connector cover portion, in a direction toward the outer circumferential surface. FIGS. 12 and 13 are front views illustrating an example sealing protrusion.

As illustrated in FIGS. 12 and 13, according to this implementation, a sealing protrusion 1123 may radially protrude from the sidewall surface 1122 of the second housing 1120 toward the connector 1240. At least part of an outer circumferential surface of the sealing protrusion 1123 may be in close contact with or substantially in close contact with the inner surface 1240b of the connector 1240 to form a sealing surface 1123a, and may be formed as a curved surface or a flat surface.

For example, as illustrating in FIG. 12, a sealing surface 1123a of the sealing protrusion 1123 according to this implementation may be formed as a curved surface. In this case, the sealing protrusion 1123 may be formed such that a central portion of the sealing surface 1123a is convexly curved. Both ends of the sealing protrusion 1123 in the circumferential direction are thus formed lower than the center. Accordingly, water moving toward the sealing surface 1123a of the sealing protrusion 1123 can flow quickly to both sides of the sealing surface 1123a, thereby being prevented from being introduced into the connector mounting groove 1112a.

Further, an outer surface of the second connector portion 1242 may be provided with a contact protrusion 1246 protruding toward the radial side surface 1114e of the connector cover portion 1114. When the connector 1240 is inserted into the connector cover portion 1114, an outer surface of the connector 1240 may be in close contact with an inner surface of the radial side surface 1114e of the connector cover portion 1114. This may result in minimizing a formation of a gap between an inner surface 1240b of the connector 1240 and the sealing protrusion 1123 of the second housing 1120.

The contact protrusion 1246 may be formed long in the axial direction, and provided in plurality which is disposed at predetermined intervals along the circumferential direction. Of course, the contact protrusion may alternatively be formed on the inner surface of the connector cover portion.

As such, as the drain pump 71 is installed in the lateral direction, the water dropped from the drum or the detergent supply portion may flow down along the outer circumferential surface of the motor housing 110 or the radial side surface 1114e and the circumferential side surfaces 1114c and 1114d of the connector cover portion 1114. The water may then permeate into the motor housing 110 through the gap between the outer circumferential surface of the second housing 1120 and the inner surface 1240b of the connector 1240.

However, as shown in this implementation, when the sealing protrusion 1123 is formed on the sidewall surface 1122 of the second housing 1120 and the sealing surface 1123a, which is an outer circumferential surface of the sealing protrusion 1123, is formed as the curved surface, the water can rapidly flow to both sides of the sealing surface 1123a so as to be prevented from permeating into the motor housing 110 in advance.

Alternatively, as illustrating in FIG. 13, the outer circumferential surface 1123a forming the sealing surface of the sealing protrusion 1123 may be flat. In this case, a sealing area between the outer circumferential surface 1123a of the sealing protrusion 1123 and the inner surface 1240b of the connector 1240 may be increased, thereby enhancing the sealing effect.

Referring to FIGS. 7, 12, and 13, a second partitioning protrusion 1121a may be formed inside the sealing protrusion 1123. The second partitioning protrusion 1121a protrudes from the second sealing surface 1121 of the second housing 1120 toward the impeller 101 by a predetermined height in the second axial direction. The second partitioning protrusion 1121a may have approximately the same height as the sidewall surface 1122 of the second housing 1120.

The second partitioning protrusion 1121a is provided by at least one to be located between the first terminal portions 1245a. For example, when the number of the first terminal portions 1245a is three, the number of the second partitioning protrusions 1121a may be two to be located one by one between the adjacent first terminal portions. Accordingly, each of the second partitioning protrusions 1121a can insulate the terminals from each other and simultaneously enhance the sealing effect, similar to the first partitioning protrusion 1241a.

What is claimed is:
1. A drain pump, comprising:
   an impeller;
   a rotor comprising a rotary shaft coupled to the impeller, the rotor being configured to provide rotational force to the impeller;
   a stator located at an outer circumferential surface of the rotor and configured to rotate the rotor;
   a first housing that defines a rotor accommodating portion that accommodates the rotor, the rotor being configured to rotate in the rotor accommodating portion;
   a second housing coupled to the first housing, the second housing, together with the first housing, defining a motor accommodating space that accommodates the stator;
   a connector that extends from the stator, the connector comprising a contact surface configured to connect to a power source and exposed to an outside of the motor accommodating space through at least one of the first housing or the second housing; and
   a connector cover portion that is located at at least one of the first housing or the second housing to cover the connector, the connector cover portion having at least one side surface opened to expose the contact surface of the connector to the outside of the motor accommodating space,
   wherein the first housing has a first open surface that faces the second housing, and the second housing has a second open surface that faces the first housing,
   wherein the connector cover portion protrudes from an edge surface of the first housing in a first axial direction away from the impeller, and
   wherein the second housing is configured to, based on being coupled to the first housing, overlap the connector cover portion in a second axial direction toward the impeller.

2. The drain pump of claim 1, wherein at least one of the first housing or the second housing defines a connector mounting groove that receives the connector, and
   wherein the connector cover portion extends from an outer circumferential surface of the connector mounting groove.

3. The drain pump of claim 2, wherein the connector cover portion defines a cover opening that exposes the contact surface of the connector that is inserted into the connector mounting groove, and
   wherein the cover opening is defined at a surface of the connector cover portion opposite to the impeller.

4. The drain pump of claim 3, wherein the connector cover portion comprises a water blocking protrusion that extends from a circumference of the cover opening by a predetermined height.

5. The drain pump of claim 4, wherein the connector cover portion further comprises an outer circumferential surface that extends from a first side of the connector cover portion in a direction inclined with respect to a center of the first housing, the water blocking protrusion being located at the first side of the connector cover portion, and
   wherein a radial distance from the center of the first housing to the outer circumferential surface of the connector cover portion decreases from the first side to a second side of the connector cover portion opposite to the first side.

6. The drain pump of claim 4, wherein the connector cover portion further comprises an outer circumferential surface that has a curved shape or an inclined shape and that extends in a circumferential direction from a first end of the connector cover portion to a second end opposite to the first end, and wherein a radial distance from a center of the first housing to at least one of the first end or the second end is less than a radial distance from the center of the first housing to another portion of the connector cover portion.

7. The drain pump of claim 1, wherein an axial depth of the connector cover portion is greater than or equal to an axial length of the connector.

8. The drain pump of claim 1, wherein the second housing comprises:
a sidewall surface that extends in the second axial direction from an edge surface of the second housing; and
a sealing protrusion that protrudes from a portion of the sidewall surface toward an inner surface of the connector and that overlaps with the connector cover portion.

9. The drain pump of claim 8, wherein the sealing protrusion has an outer circumferential surface that is curved along a circumferential direction of the second housing.

10. The drain pump of claim 8, wherein the sealing protrusion has a flat outer circumferential surface corresponding to the inner surface of the connector.

11. The drain pump of claim 1, wherein the connector comprises first terminal portions located inside the motor accommodating space and second terminal portions located at the contact surface outside the motor accommodating space, and
wherein one of the first housing or the second housing does not include the connector cover portion, and
wherein the one of the first housing or the second housing includes a partitioning protrusion that partitions the first terminal portions.

12. The drain pump of claim 11, wherein the partitioning protrusion extends radially outward to a sidewall surface of the one of the first housing or the second housing that includes the partitioning protrusion.

13. A drain pump, comprising:
an impeller;
a motor coupled to the impeller and configured to provide rotational force to the impeller;
a motor housing configured to accommodate the motor;
a connector having a first end electrically connected to the motor and a second end exposed to an outside of the motor housing, the connector comprising a contact surface configured to connect to an external power source and spaced apart from the impeller in an axial direction; and
a connector cover portion that is located at the motor housing and that covers the connector,
wherein the connector cover portion comprises:
a first axial side surface that defines a cover opening opened in a direction opposite to the impeller,
a second axial side surface opposite to the first axial side surface,
a first circumferential side surface and a second circumferential side surface that are spaced apart from each other in a circumferential direction and that are each extend in the axial direction from the first axial side surface to the second axial side surface, and
a radial side surface that defines an outer surface of the connector cover portion and that connects the second axial side surface, the first circumferential side surface, and the second circumferential side surface,
wherein the motor housing comprises a plurality of housings that are coupled to each other, each of the plurality of housings defining an opening that faces an opening of another housing among the plurality of housings,
wherein a first housing among the plurality of housings comprises the connector cover portion,
wherein the connector cover portion protrudes in the axial direction from an end portion of the first housing to a position outward of or corresponding to an end portion of the connector,
wherein the connector cover portion further comprises an inner surface that defines a connector mounting groove that receives the connector,
wherein a second housing among the plurality of housings does not comprises the connector cover portion,
wherein the second housing is configured to, based on being coupled to the first housing, overlap the connector cover portion in the axial direction, and
wherein an outer circumferential surface of the second housing faces an inner surface of the connector based on the second housing being coupled to the first housing.

14. The drain pump of claim 13, wherein the outer circumferential surface of the second housing has a curved shape that extends in the circumferential direction.

15. The drain pump of claim 13, wherein the outer circumferential surface of the second housing has a flat shape.

16. The drain pump of claim 13, wherein at least one of the first circumferential side surface, the second circumferential side surface, or the radial side surface comprises a water blocking protrusion located at a position closer to the first axial side surface than to the second axial side surface.

17. The drain pump of claim 13, wherein a distance between a center of the motor housing and at least one of the first circumferential side surface, the second circumferential side surface, or the radial side surface decreases from the first axial side surface toward the second axial side surface.

* * * * *